US011998827B2

(12) United States Patent
Liao et al.

(10) Patent No.: US 11,998,827 B2
(45) Date of Patent: Jun. 4, 2024

(54) INTERACTIVE EXERCISE APPARATUS

(71) Applicant: Johnson Health Tech. Co., Ltd., Taichung (TW)

(72) Inventors: Hung-Mao Liao, Taichung (TW); Ziv Chang, Taichung (TW)

(73) Assignee: Johnson Health Tech Co., Ltd., Taichung (TW)

( * ) Notice: Subject to any disclaimer, the term of this patent is extended or adjusted under 35 U.S.C. 154(b) by 0 days.

(21) Appl. No.: 17/978,928

(22) Filed: Nov. 1, 2022

(65) Prior Publication Data

US 2023/0054247 A1 Feb. 23, 2023

Related U.S. Application Data

(63) Continuation of application No. 17/013,884, filed on Sep. 8, 2020, now Pat. No. 11,517,807.

(30) Foreign Application Priority Data

Jan. 3, 2020 (CN) .......................... 202010005036.4

(51) Int. Cl.
*A63B 71/06* (2006.01)
*A63B 21/00* (2006.01)
*G06V 40/20* (2022.01)

(52) U.S. Cl.
CPC ...... *A63B 71/0622* (2013.01); *A63B 21/4037* (2015.10); *G06V 40/23* (2022.01); *A63B 2071/0638* (2013.01); *A63B 2071/0647* (2013.01); *A63B 2071/0658* (2013.01); *A63B 2071/0677* (2013.01); *A63B 2210/50* (2013.01);

(Continued)

(58) Field of Classification Search
CPC ............ A63B 71/0622; A63B 21/4037; A63B 2071/0638; A63B 2071/0647; A63B 2071/0658; A63B 2071/0677; A63B 2210/50; A63B 2220/10; A63B 2220/13; A63B 2220/56; A63B 2220/805; A63B 2225/09; A63B 2225/12; A63B 2071/063; A63B 2220/89; A63B 24/0087; A63B 2071/068; A63B 2071/0683; A63B 2220/52; A63B 2220/806; A63B 2225/096; A63B 2225/20; A63B 2225/50; G06V 40/23; G09B 19/0038; A47G 1/02; G05D 3/12; G06F 3/013
See application file for complete search history.

(56) References Cited

U.S. PATENT DOCUMENTS

2022/0192346 A1 * 6/2022 Mouizina ................ G06T 11/60

FOREIGN PATENT DOCUMENTS

| CA | 3101984 C | * | 10/2023 | ............. A45D 42/00 |
| KR | 102172585 B1 | * | 11/2020 | |
| KR | 20210008104 A | * | 1/2021 | |

* cited by examiner

*Primary Examiner* — Jeffrey S Vanderveen

(57) ABSTRACT

An interactive exercise apparatus for guiding a user to perform an exercise includes a frame, a mirror, a display device, a driving mechanism, and a control unit. The mirror is movably mounted on the frame and configured to reflect an image of the user. The display device is disposed on a backside of the mirror and visible through the mirror. The driving mechanism is configured to drive the mirror to move with respect to the frame. The control unit is operable to control the driving mechanism according to a location of the user so as to control the mirror to move to a suitable position where the user can see their reflected image.

20 Claims, 21 Drawing Sheets

(52) U.S. Cl.
CPC ....... *A63B 2220/10* (2013.01); *A63B 2220/13* (2013.01); *A63B 2220/56* (2013.01); *A63B 2220/805* (2013.01); *A63B 2225/09* (2013.01); *A63B 2225/12* (2013.01)

INTERACTIVE EXERCISE APPARATUS

BACKGROUND

1. Field of the Invention

The present invention relates to an interactive exercise apparatus. More particularly, the present invention relates to a mirror display device which is able to guide a user to perform exercises.

2. Description of the Related Art

Indoor exercise is becoming more and more popular in these days. More people are becoming aware of the need to exercise in order to maintain or improve their health and fitness. Since a person's schedule, weather, or other factors may prohibit the person from exercising outdoors, it is more convenient for the person to exercise indoors. Accordingly, indoor exercise apparatuses such as treadmills, stair exerciser apparatuses, steppers, exercise bikes provide such advantages for the person to use.

There is a smart mirror product on the market, which can display demonstration images on the mirror, as a fitness instructor provides real-time instructions. When the user stands in front of the fitness mirror, the user can see their mirror image and follow the demonstration images to perform workout, such that the user can correct their motion or posture immediately.

The aforementioned smart mirror allows the user to follow the movement of the demonstration images for fitness exercises. However, it may not be convenient to use the conventional smart mirror in some states. Because the height, angle and position of the smart mirror are fixed, the height and position of the smart mirror cannot be automatically adjusted following the location of the user's body. For example, it would be possible to fix the smart mirror on the wall to keep the smart mirror vertical, or lean the smart mirror against the wall to stand on the ground at a slight angle to make the smart mirror slightly tilt up. But when the user is sitting or lying down to perform exercises (e.g. sit-up exercise), it is difficult to see the whole body through the smart mirror.

The present invention has arisen to mitigate and/or obviate the disadvantages of the conventional method. Further benefits and advantages of the present invention will become apparent after a careful reading of the detailed description with appropriate reference to the accompanying drawings.

SUMMARY

The present invention is directed to a smart mirror for fitness exercises. The smart mirror has a mirror which is capable of automatically adjusting the angle and/or height or position of the mirror for allowing a user to see their mirror image in the mirror during exercise.

According to one aspect of the present invention, an interactive exercise apparatus for guiding a user to perform exercises includes a frame, a mirror, a display device, a driving mechanism, a determination unit, and a control unit. The mirror is movably mounted on the frame and configured to reflect an image of the user in front of the mirror. The display device is disposed on a backside of the mirror and visible through the mirror. The display device is provided to show workout information and video content for the user to view. The video content includes a guiding image for guiding the user to perform an exercise. The driving mechanism is mounted between the frame and the mirror for electrically driving the mirror to move with respect to the frame. The determination unit is configured to determine location and posture of the user who is performing the exercise. The control unit is electrically connected or otherwise operationally connected to the driving mechanism and the determination unit, and being operable to control the driving mechanism according to the location or posture of the user identified by the determination unit so as to control the mirror to move to a suitable position and/or angle where the user can see their reflected image.

Preferably, the determination unit is operable to predict the location or posture of the user according to movement of the guiding image which guides the user to perform the exercise.

Preferably, the determination unit has an image recognition device configured to detect the location or posture of the user by means of image recognition.

Preferably, the determination unit has a plurality of sensors disposed on a front of the frame, the determination unit configured to identify the location or posture of the user via the plurality of sensors.

Further benefits and advantages of the present invention will become apparent after a careful reading of the detailed description with appropriate reference to the accompanying drawings.

DETAIL DESCRIPTION

Figure 1:
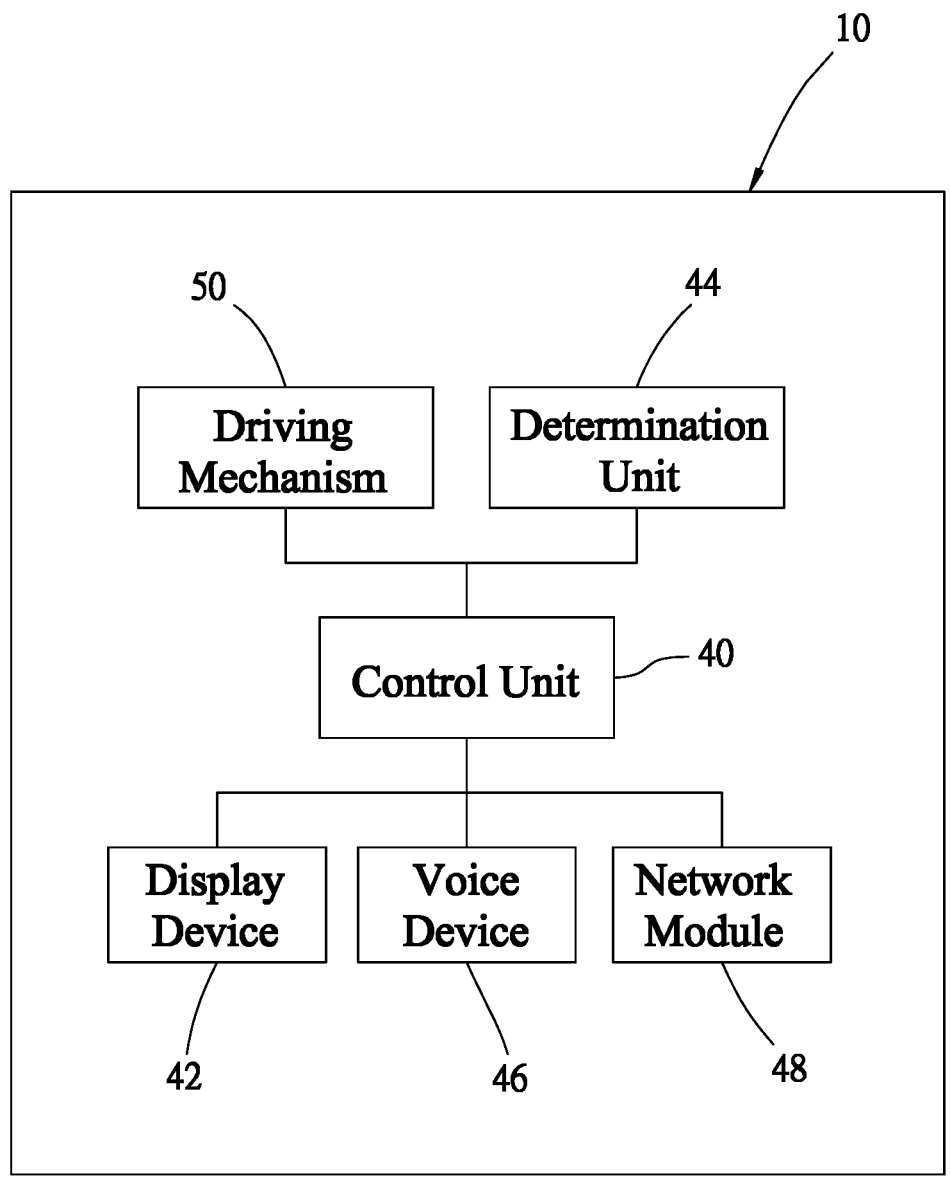
FIG. 1 is a block diagram of a smart mirror in accordance with a preferred embodiment of the present invention.
Figure 2:
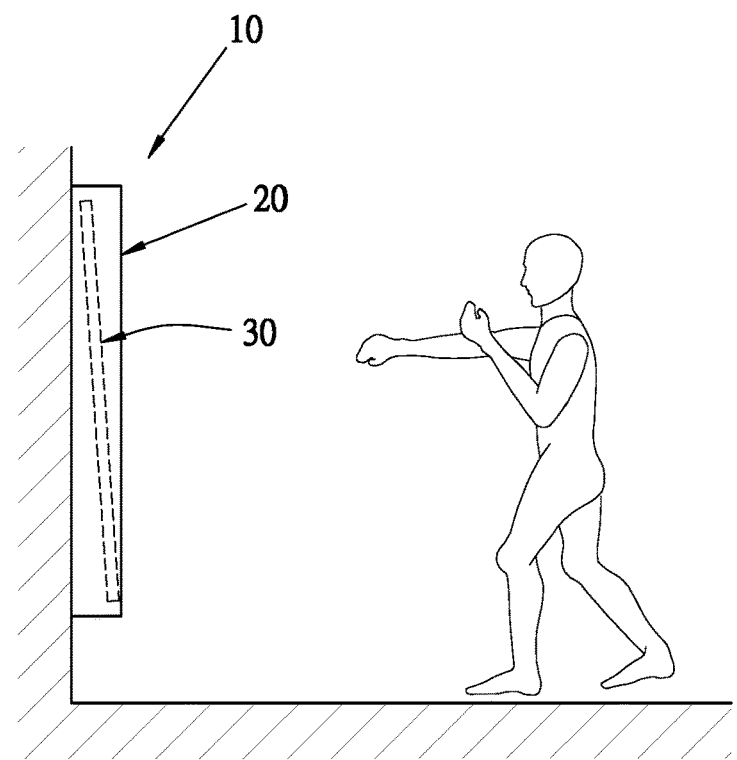
FIG. 2 to FIG. 5 show a user performing fitness exercises through the smart mirror, showing that the displacement and/or angle of the mirror can be automatically controlled.
Figure 3:
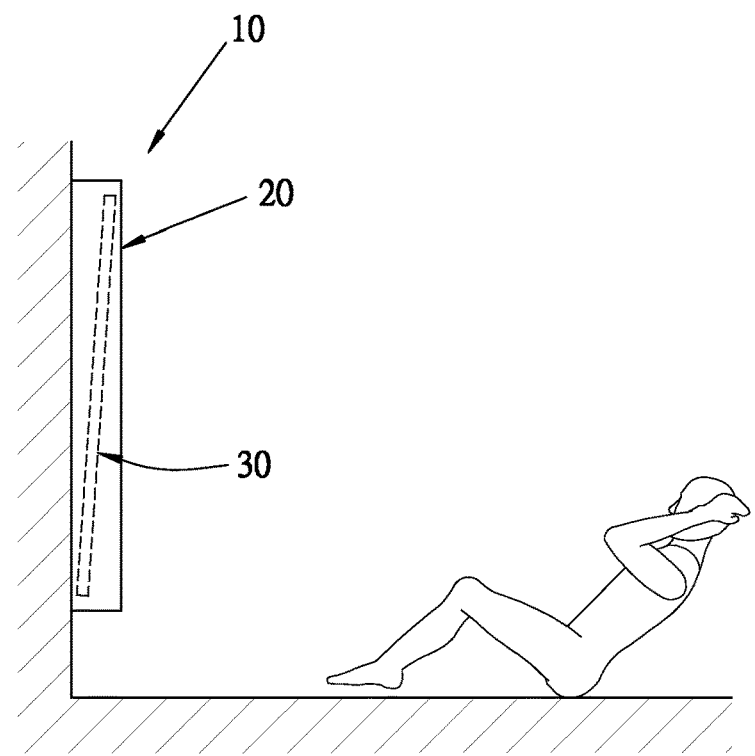

Referring to FIG. 1 through FIG. 3, an interactive exercise apparatus, also referred to as a smart mirror 10, is illustrated in accordance with a preferred embodiment of the present invention. The smart mirror 10 includes a frame 20, a mirror 30 movably mounted within the frame 20, a control unit 40, a display device 42, a determination unit 44, a voice device 46, a network module 48 and a driving mechanism 50. The smart mirror 10 is capable of automatically adjusting the angle and/or height of the mirror 30 to allow a user to see their reflected image in the mirror 30.

The determination unit 44 is able to predict or determine the location or posture of the user's body. For example, the determination unit 44 can determine the posture, location and height of the user by means of detection devices or sensing devices. The driving mechanism 50 is arranged between the frame 20 and the mirror 30. The control unit 40 is operable to control displacement and position of the mirror 30 by controlling the driving mechanism 50 according to the location or posture of the user identified by the determination unit so as to control the mirror to move to a suitable position and/or angle. In the preferred embodiment of the present invention, the main purpose of controlling the displacement of the mirror 30 is to match the viewing angle of the user when watching the mirror 30, so the determination unit 44 may directly predict or determine the location of the user's head or eyes, or it may indirectly predict the location of the head or eyes by determining or judging the posture or location of the user's body, or the posture or location of a part of the user's body (e.g. trunk, limbs).

The displacement of the mirror 30 described herein includes: angular displacement of the mirror 30, vertical displacement of the mirror 30 and horizontal displacement of the mirror 30. The mirror 30 is able to be adjusted to change its angular position or angle, the vertical position and/or the horizontal position.

Figure 6:
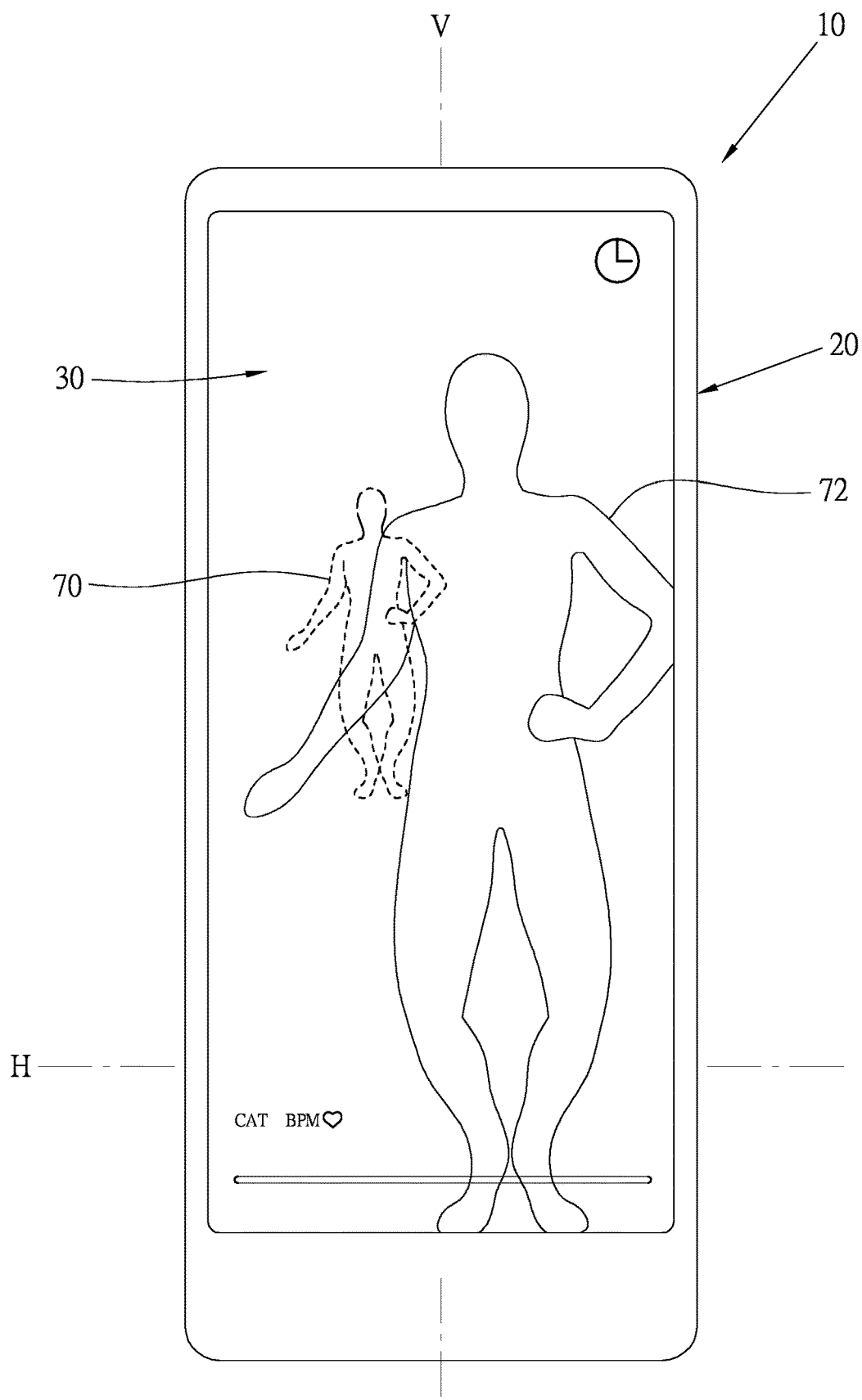
FIG. 6 shows that the user is performing a fitness exercise with a fitness course displayed on the smart mirror, and illustrates a first control method for controlling the displacement and/or angle of the mirror by detecting the user's location relative to the mirror.

Referring to FIG. 6, the frame 20 defines a horizontal axis H and a vertical axis V. The horizontal axis H and the vertical direction are perpendicular to each other. In the preferred embodiment of the present invention, the aforementioned angular displacement of the mirror 30 includes: rotation of the mirror 30 about the horizontal axis H so that the mirror 30 is able to angle up and down relative to the frame 20, and rotation of the mirror 30 about the vertical axis V so that the mirror 30 is able to rotate to left or right relative to the frame 20. The aforementioned vertical displacement represents movement up and down along the vertical axis V to a higher position or lower position. The aforementioned horizontal displacement represents horizontal movement to the left or right. The mirror 30 can be displaced in two-dimensions or in three-dimensions. For example, the mirror 30 can rotate or move along the horizontal axis H and the vertical axis V of the frame 20 at the same time.

In the preferred embodiment of the present invention, there are three control methods to automatically control movement of the mirror 30 of the smart mirror 10. The first control method is for a user to exercise with guiding images of an exercise course, and thereby control the displacement of the mirror 30 according to the content of the current exercise course. The second control method is using image recognition technology to control the displacement of the mirror 30. The third control method is to control the displacement of the mirror 30 by sensing the posture, location and height of the user's body. The second control method and the third control method may also be applied to the state that the user is performing the exercise following the guiding images.

As shown in FIG. 6, the user is following the guiding image 70 to perform an exercise course, and the smart mirror 10 automatically adjusts the angle and/or height of the mirror 30 as the exercise course progresses for allowing the user to see their whole body from the mirror 30 as much as possible. The first control method is to display exercise courses, and let the user follow or mimic images of the exercise course to perform exercise motions, as an instructor or trainer or exercise program guides the user to perform fitness exercises. In the preferred embodiment of the present invention, the smart mirror 10 is operable to display guiding images of an exercise course on the mirror 30 through the display device 42, such that the user is able to not only see the guiding image 70 but also see their mirror image 72 reflected in the mirror 30. The guiding image 70 on the mirror 30 may be a real person image, a virtual avatar or a virtual skeleton image, such that the user is able to perform exercise according to the motion of the guiding image 70. The guiding image 70 can be displayed in the center of the mirror 30 or at corner of the mirror 30.

As described previously, the determination unit 44 of the smart mirror 10 will predict the posture or position of the user based on the posture of the guiding image 70 of the exercise course, and the mirror 30 is driven to automatically adjust the angle and/or height of the mirror 30. For example, during the exercise course, the determination unit 44 can analyze or receive the exercise posture of the guiding image 70 of the exercise course through software or other methods to determine or predict the current or upcoming action of the user. Referring to FIG. 2, when the guiding action of the active guiding image 70 is, for example, in a predominately standing position, such as when the guiding image is demonstrating or requesting a boxing exercise, the determination unit 44 presumes that the user will stand up and perform the boxing exercise, and the control unit 40 is operable to control the driving mechanism 50 to drive the mirror 30 to stand upright, and/or raise the mirror 30 to a higher position, or make the mirror 30 be slightly tilted upward (namely the upper half portion of the mirror 30 is slightly rearward than the lower half portion of the mirror 30) according to the judgement of the determination unit 44, as shown in FIG. 2, so that the user can see their whole body from the mirror 30 under the condition of a standing exercise. In contrast, when the guiding image is demonstrating or requesting a core workout such as sit-ups, as shown in FIG. 3, the determination unit 44 presumes that the user is lying down to perform sit-ups at this time, and the control unit 40 is operable to control the driving mechanism 50 to drive the mirror 30 to be slightly tilted downward (namely the upper half portion of the mirror 30 is slightly forward than the lower half portion of the mirror 30) and/or move to a lower position according to the judgement of the determination unit 44, so that the user can see their whole body from the mirror 30 when lying down or at a low position.

The determination unit 44 is able to predict the head location of the user who is following the exercise from the motion demonstrated by the guiding image 70. For example, when the guiding image 70 demonstrates or requires standing exercises, the head of the human body is generally at a higher location, and the mirror 30 is controlled by the driving mechanism 50 to a standing state, a higher position, and/or tilt upward to match the head location and the viewing angle of the user's eyes. In the preferred embodiment of the present invention, the mirror 30 can be tilted up within a predetermined inclination angle (as shown in FIG. 2) or tilted down within a predetermined declination angle (as shown in FIG. 3), namely the inclination or declination angle of the mirror 30 is adjustable. For example, the maximum inclination angle and the maximum declination angle are 5 degrees each, so that the mirror 30 can be rotated about the horizontal axis H within a range of 10 degrees.

Figure 4:
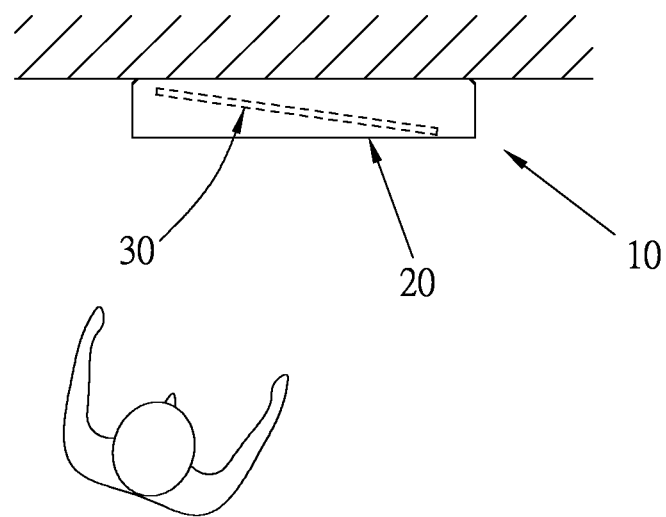
Figure 5:
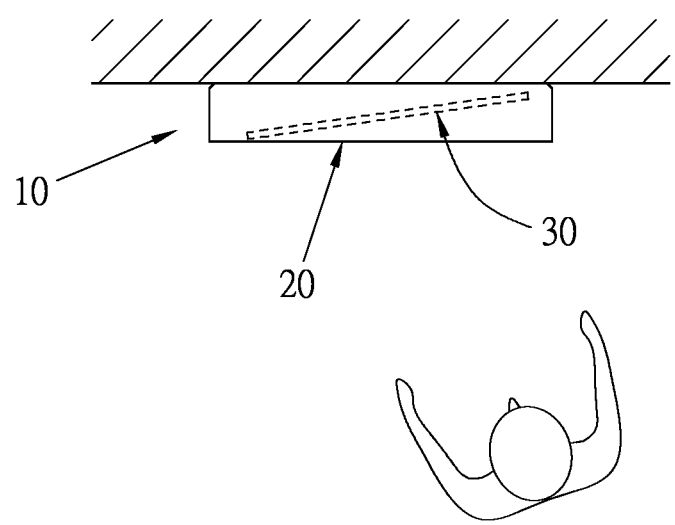

Referring to FIG. 4 and FIG. 5, when the guiding image 70 shows guiding motions demonstrating or requesting the user to move to the left side or right side of the mirror 30, such as stepping or jumping to the left or right, the determination unit 44 presumes that the user will move to the left or right at this time, and the control unit 40 is operable to control the driving mechanism 50 to drive the mirror 30 to rotate to the left or right toward the user according to the judgement of the determination unit 44, so that the user can see their reflected image from the mirror 30 on the left side or right side. Specifically, the mirror 30 can be rotated about the vertical axis V to the left or right within a predetermined angle. For example, the mirror 30 can be rotated at most 5 degrees to the left or right. Since the mirror 30 keeps facing the user, no matter where the user's head is located or located on the left side, right side or in front of the smart mirror 10, users can see the guiding image and their reflected image clearly and completely so as to ensure the exercise effect.

Figure 7:
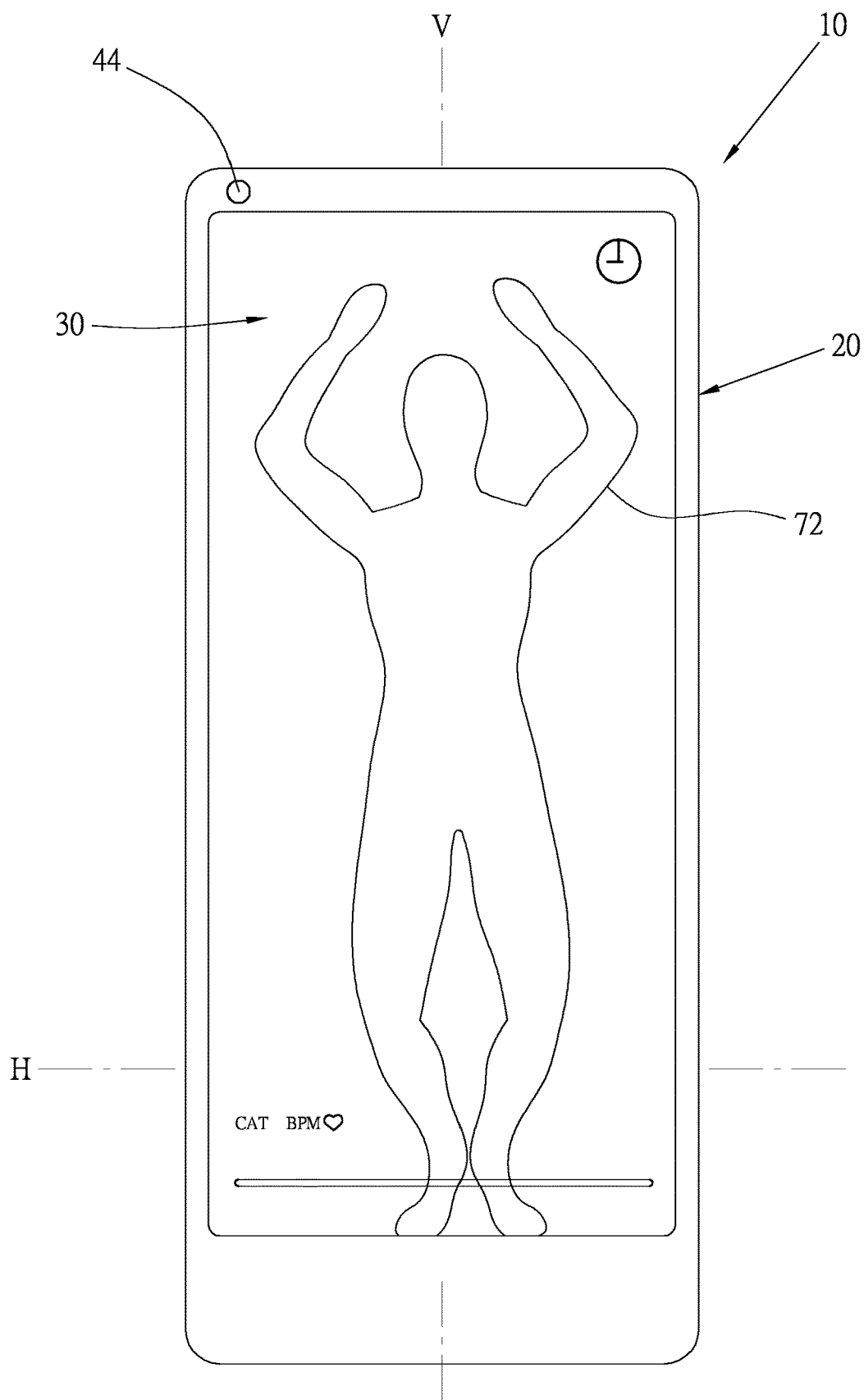
FIG. 7 illustrates a second control method for controlling the displacement and/or angle of the mirror by detecting the user's posture or position.

The second control method to automatically control the angle and/or height of the mirror 30 is using image recognition technology (namely using an image recognition device) to detect the user's posture, position and height, and determine whether the user is currently standing, sitting, or lying down, or to directly detect the location of the user's head or eyes. In order to achieve the aforementioned image recognition, the determination unit 44 may be a camera device installed on the smart mirror 10, as shown in FIG. 7, or an optical sensor, an infrared (IR) sensor, thermographic camera or other sensing devices with function of image identification for detecting objects such as a human body. Through image recognition of the user, the determination unit 44 can detect whether the user is standing, sitting or lying, or detect the location of the user, especially the user's head or eyes, and the control unit 40 is operable to make the driving mechanism 50 drive the mirror 30 to move according to the detection result of the determination unit 44, so that the mirror 30 can be displaced with the movement state (e.g. standing, lying or jumping) of the user, or be displaced according to the location of the user. Therefore, the smart mirror 10 can control the displacement and position of the mirror 30 according to the location or height of the user's body, so that the mirror 30 can face toward the user at any time for allowing the user to see their whole body from the mirror 30 as much as possible, as shown in FIG. 2 to FIG. 5.

Figure 8:
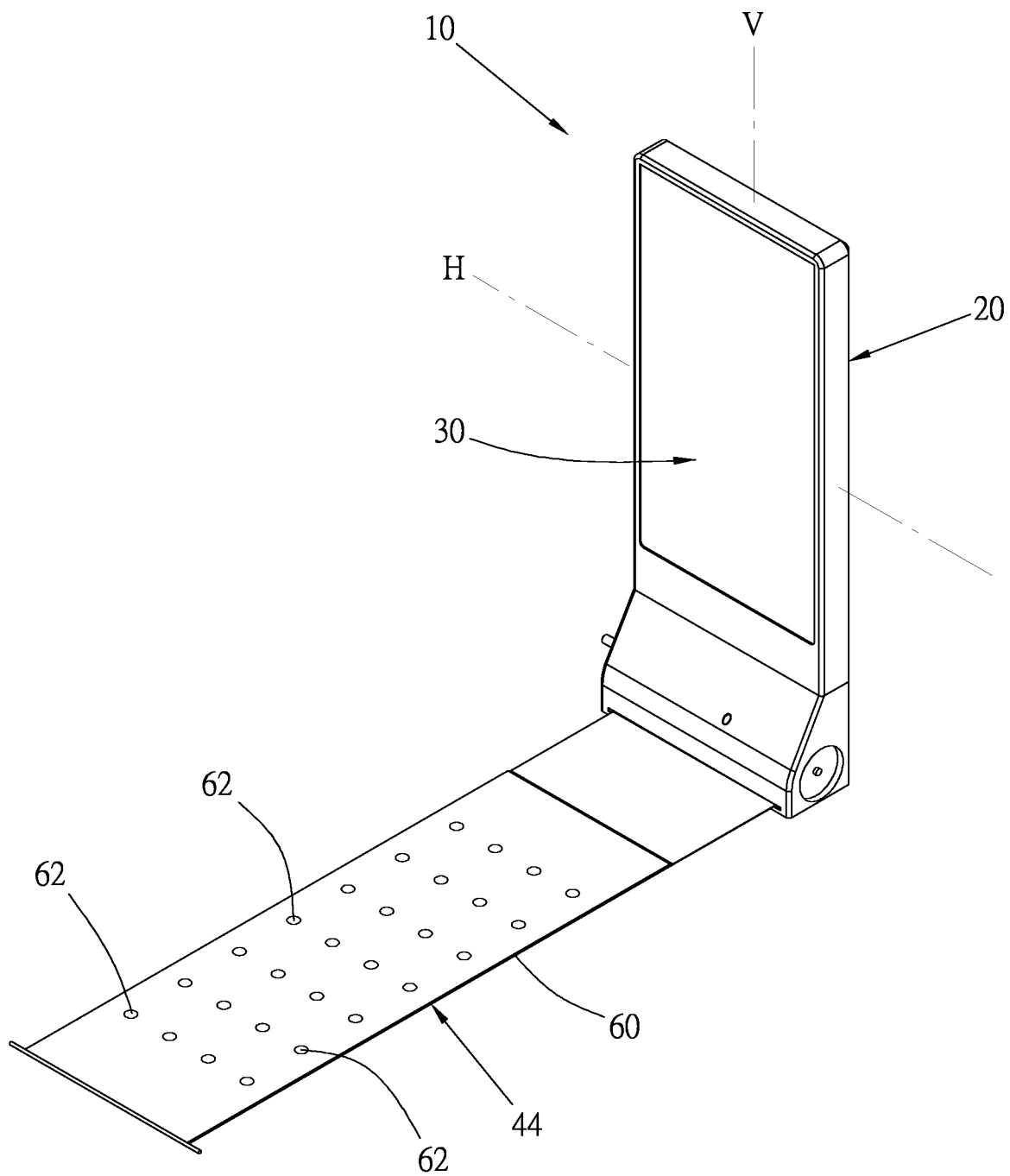
FIG. 8 illustrates a third control method for controlling the displacement of the mirror by sensing the user's position, wherein the smart mirror has a pad body with a plurality of sensors.

The third control method to automatically control and angle and/or change the height of the mirror 30 is using sensing devices to sense the user's posture, position and height, and determine whether the user is standing, sitting, or lying down. Referring to FIG. 8, the determination unit 44 includes a plurality of sensors 62 disposed in front of the frame 20 for sensing the position of the user or the user's posture. In the example shown in FIG. 8, the determination unit 44 has a pad body 60 and a plurality of sensors 62 arranged regularly in the pad body 60. The sensors 62 may include, but not be limited to, tactile sensors, pressure sensors, photoelectric sensors, etc. Preferably, the sensors 62 are provided to determine the posture and location of the user by sensing the variation of the weight or the size of the sensing area. In this example, the sensors 62 can sense the weight pressing on the pad body 60 and determine whether the user is currently standing, sitting, or lying on the pad body 60 on the basis of the area or number of the pressure-loaded sensors. For example, when the number of the sensors 62 that sense the load on the pad body is less and the stress per unit area is larger, it can be judged that the user is standing. In contrast, when the number of the sensors 62 that sense the load on the pad body is more and the stress per unit area is smaller, it can be judged that the user is sitting or lying. The control unit 40 is operable to control the driving mechanism 50 to drive the displacement of the mirror 30, so that the smart mirror 10 can control the displacement and position of the mirror 30 to keep the mirror 30 facing toward the user for allowing the user to see their whole body as far as possible. Note that the sensors described in this example are illustrative only. There are many other ways of using sensors to determine the position of a user, and it will be apparent to those skilled in the art that various modifications and variations can be made to the structure of the present invention without departing from the scope or spirit of the invention.

By the aforementioned three control methods, the smart mirror 10 is provided for sensing the user to automatically adjust the angle and/or height of the mirror 30 according to the body posture of location of the user when the user faces the mirror 30 for fitness exercises, so that the user is able to view themselves in the mirror in various exercise postures.

Figure 9:
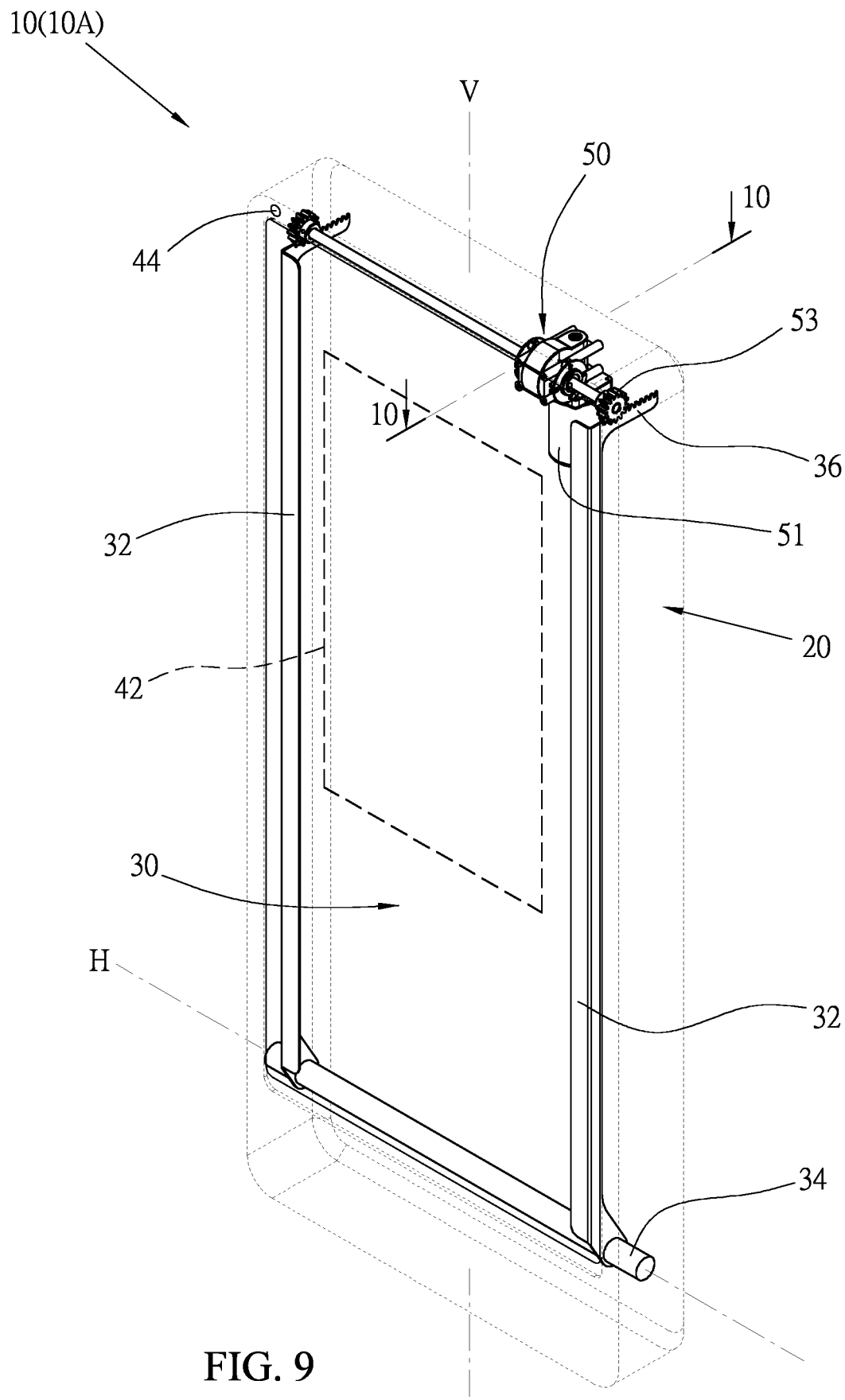
FIG. 9 is a perspective view of the smart mirror in accordance with a first embodiment of the present invention.
Figure 10:
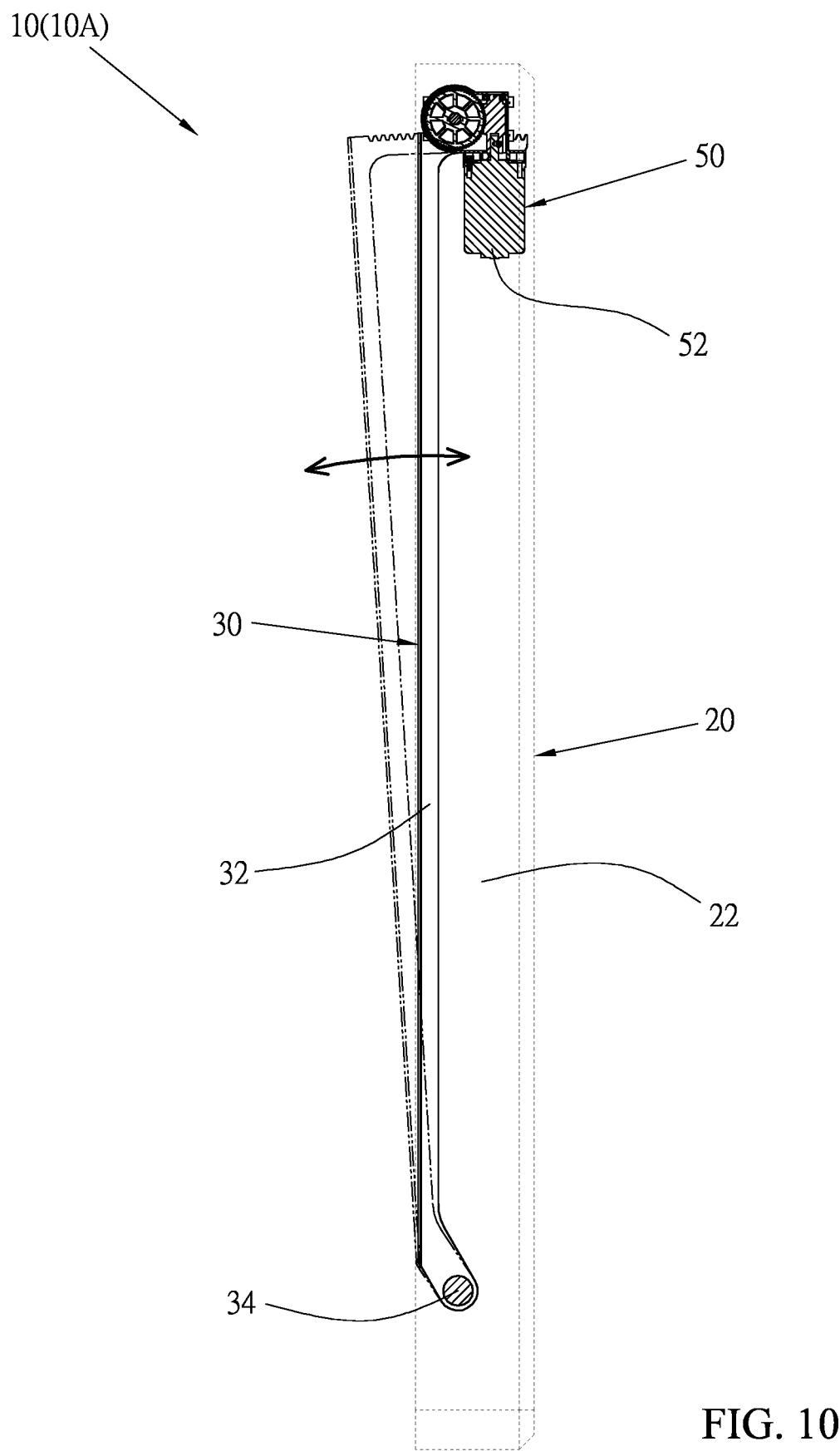
FIG. 10 is a cross-section view along line 10-10 of FIG. 9.
Figure 11:
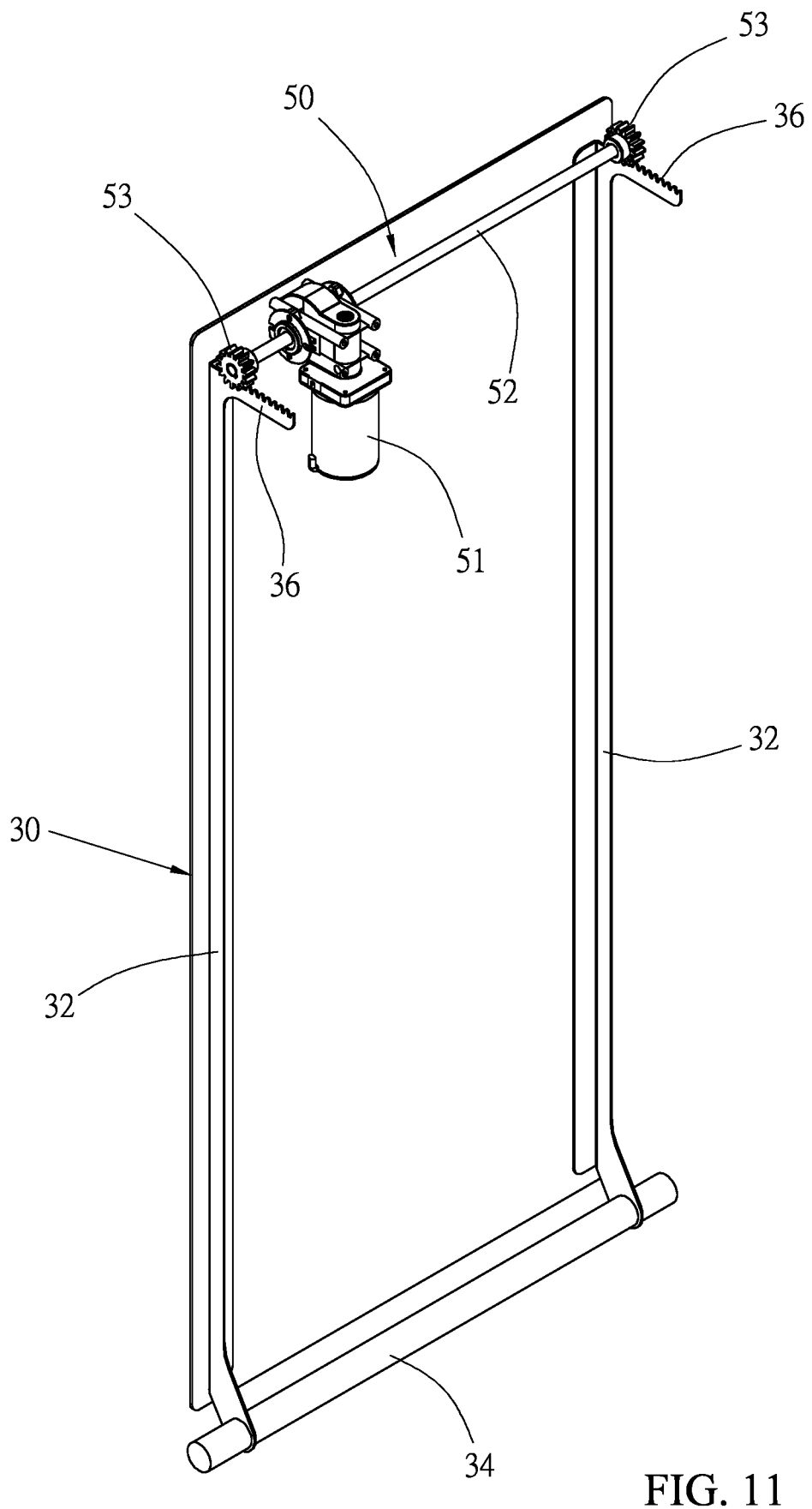
FIG. 11 is a perspective view for showing the mirror and the driving mechanism of the smart mirror shown in FIG. 9.

Referring to FIG. 9 and FIG. 10, a smart mirror 10A in accordance with a first preferred embodiment has a frame 20 and a mirror 30. The frame 20 is a mirror holder, having a space 22 recessed in the frame 20 for allowing the mirror 30 to be arranged in the space 22, such that the mirror 30 is mounted on the front of the frame 20 for allowing the user to see the mirror image reflected in the mirror 30. The mirror 30 can be rotatable about the horizontal axis H (namely angular displacement) with respect to the frame 20. In the preferred embodiment of the present invention, the mirror 30 has a bracket 32 mounted on the backside of the mirror 30, as shown in FIG. 11. The bracket 32 is pivotally connected to the frame 20 by a horizontal pivot shaft 34, so that the mirror 30 is able to rotate about the horizontal axis H of the frame 20. It should be noted that the pivot shaft 34 can be arranged at any position of the mirror 30, for example, at the center of the mirror. It is not limited to be arranged at the bottom of the mirror 30, as shown in the FIG. 9.

The aforementioned driving mechanism 50 is mounted between the frame 20 and the mirror 30 for driving displacement/rotation of the mirror 30. As shown in FIG. 11, the driving mechanism 50 has an electric motor 51 (e.g. a stepper motor) mounted on the frame 20. When the electric motor 51 is operable to rotate a rotating shaft 52, the mirror 30 can be driven to rotate about the horizontal axis H by meshing relationship of several gears 53 on the rotating shaft 52 and several gear racks 36 (e.g. arc-shaped gear rack) of the bracket 32. Therefore, the driving mechanism 50 is capable of driving the mirror 30 to rotate up and down about the horizontal axis H, so that the inclination of the mirror 30 can be adjustable to meet the requirement of the user.

Referring to FIG. 1, the control unit 40 is the operation center of the smart mirror 10 for controlling the action of the smart mirror 10. In the preferred embodiment of the present invention, the control unit 40 has a built-in memory and other external memory devices for storing the driver, operating system, APP application, and other necessary files for the operation of the smart mirror 10, such as fitness/exercise demonstration video and fitness/exercise program.

The display device 42 is arranged in the space 22 of the frame 20 and disposed on the backside of the mirror 30. The display device 42 can be connected to the back of the mirror 30 and moved along with the mirror 30, or it can be fixed to the frame 20 without moving with the mirror 30. The display device 42 is configured for displaying various information such as video content, images, graphics, exercise metrics, or messages on the mirror 30. The video content includes decomposition and explanation images of workout movements, and/or guiding images of continuous motion of workout demonstrations. The information includes general information (e.g., date, time, or any feedback words) and exercise information (e.g. heat rate, calories, elapsed time, exercise progress, statistic information, exercising target and achievement rate). The mirror 30 is a semi-reflective mirror such that the images, videos or information displayed on the display device 42 are visible through the mirror 30. As shown in FIG. 6, when the user stands before the mirror 30, the user can simultaneously see their mirror image 72 and images (e.g. guiding image 70) and any information displayed on the display device 42.

The voice device 46 include a speaker to provide different sounds or voices according to the usage state of the smart mirror 30, such as prompting sounds, video sounds, or inspiring verbal messages to the user The voice device 46 may also include a voice receiver, so that the user can control the smart mirror 10 via voice.

The network module 48 may be a wired or wireless network module, so that the smart mirror 10 can be connected to a server and/or a smart device (e.g. a smart phone, a tablet, a computer) via the network so as to update and transmit data, and to receive exercise courses. Moreover, the smart mirror 10 may include a Bluetooth module for communicating with other apparatuses with Bluetooth and transmitting data, and a power module for providing power to the smart mirror 10.

Figure 12:
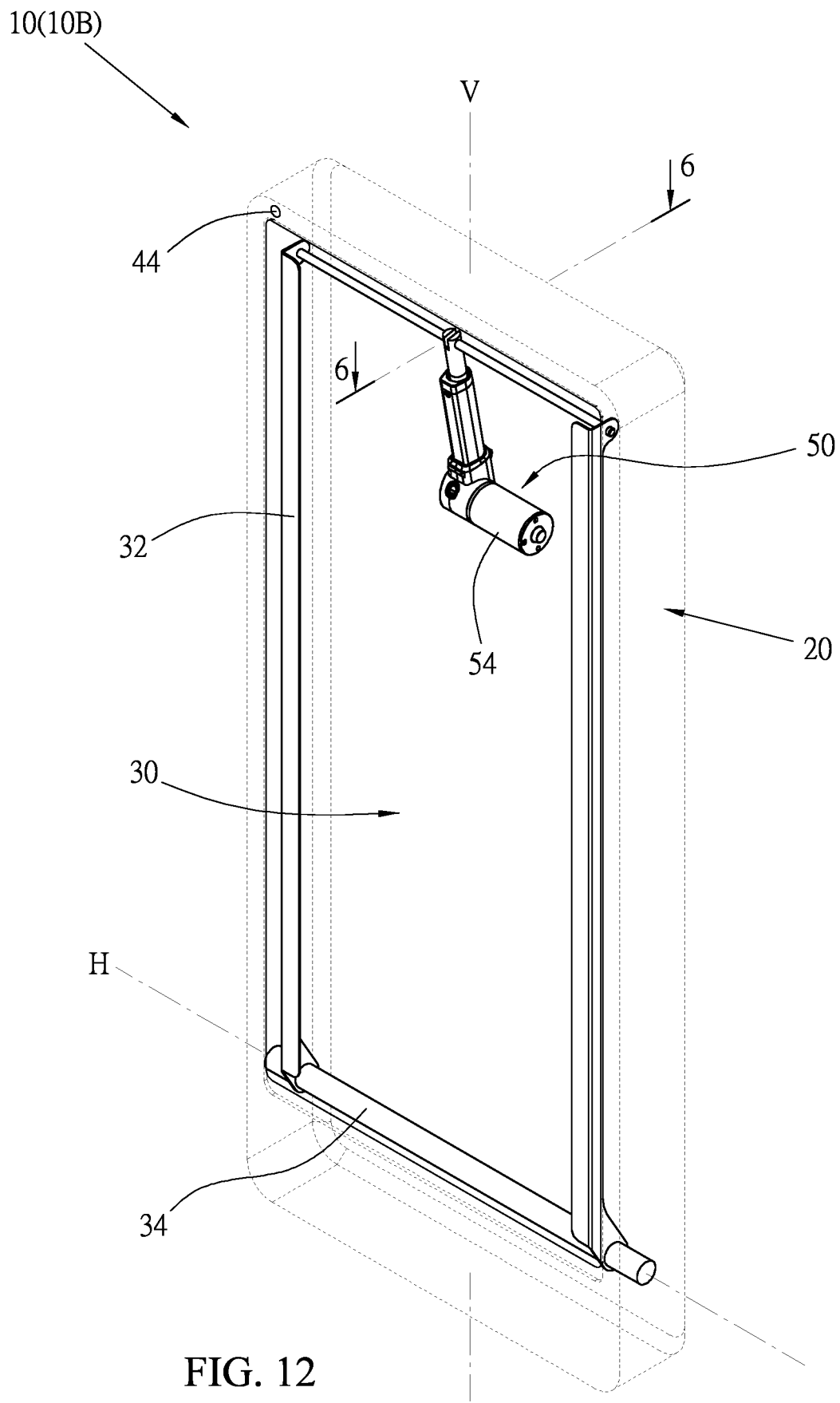
FIG. 12 is a perspective view of the smart mirror in accordance with a second embodiment of the present invention.
Figure 13:
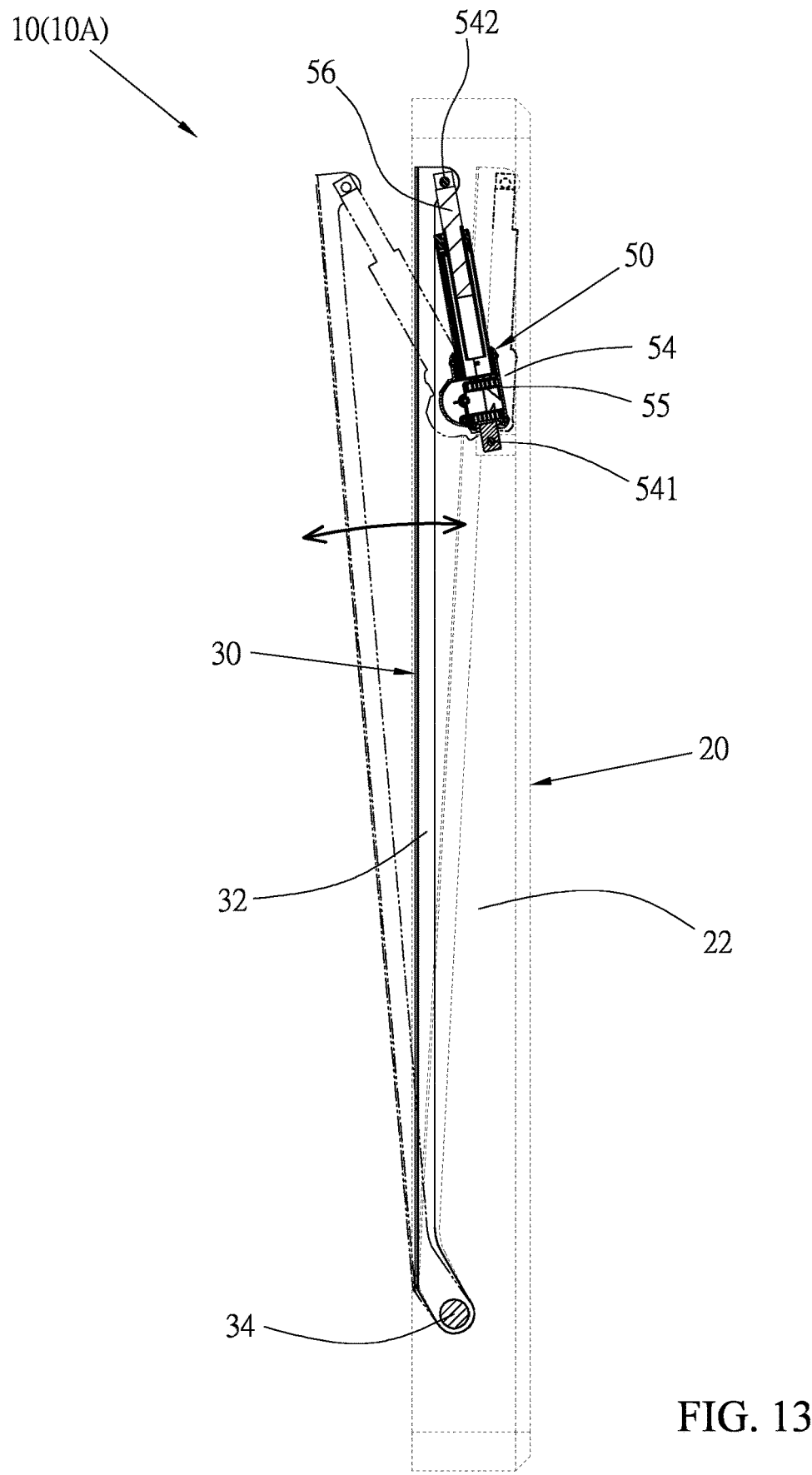
FIG. 13 is a cross-section view along line 13-13 of FIG. 12.

Referring to FIG. 12 and FIG. 13, a smart mirror 10B in accordance with a second preferred embodiment is similar to the first embodiment of the present invention. The smart mirror 10B also has a frame 20, a mirror 30 mounted in the space 22 of the frame 20, and a driving mechanism 50 mounted in the space 22 of the frame 20 and coupled to the mirror 30. The driving mechanism 50 is operable to drive the mirror 30 to rotate about the horizontal axis H, so that the mirror 30 can be rotated upward to a higher inclination angle or rotated downward to a lower inclination angle.

Figure 14:
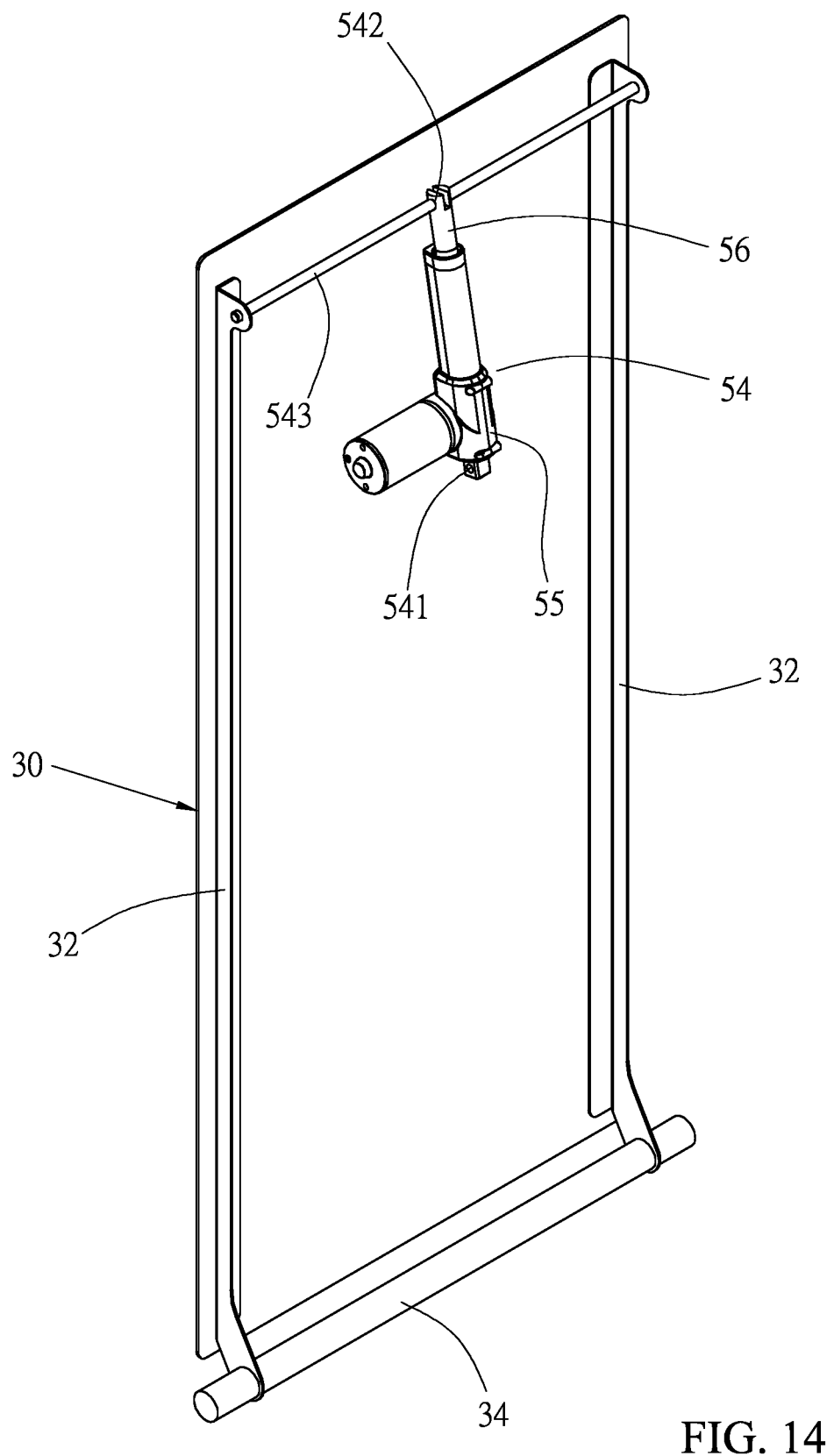
FIG. 14 is a perspective view for showing the mirror and the driving mechanism of the smart mirror shown in FIG. 12.

As shown in FIG. 14, the driving mechanism 50 is an electric telescopic member 54 having a main body 55 and a telescopic rod 56 telescopically mounted within the main body 55, such that the telescopic rod 56 is able to extend upward or downward relative to the main body 55, namely the axial length of the telescopic member 54 is adjustable. The telescopic member 54 has a first pivot end 541 pivotally connected to the frame 20 and a second pivot end 542 pivotally connected to the mirror 30. For example, the second pivot end 542 of the telescopic member 54 is pivotally coupled to the bracket 32 of the mirror 30 by a pivot rod 543. Referring to FIG. 13, the first pivot end 541, the second pivot end 542 and the pivot shaft 34 (namely the pivot portion between the mirror 30 and the frame 20) forms a triangle configuration, and the telescopic member 54 is a side of the triangle. When the telescopic member 54 is stretched or shortened, the length of the side of the triangle is increased or decreased to change the shape of the triangle, so that the mirror 30 can be driven to rotate about the horizontal axis H. Note that the method of changing the angle of the mirror 30 described in this example are illustrative only. There are many other ways of changing the angle of the mirror 30 to reposition the mirror 30 so that it is angled at a higher inclination angle or a lower inclination angle. Similarly, it is also possible to angle the mirror by rotating the mirror 30 about the vertical axis V to reposition the mirror 30 so that it is angled more to the left or more to the right. It will be apparent to those skilled in the art that various modifications and variations can be made to the structure of the present invention without departing from the scope or spirit of the invention.

Figure 15:
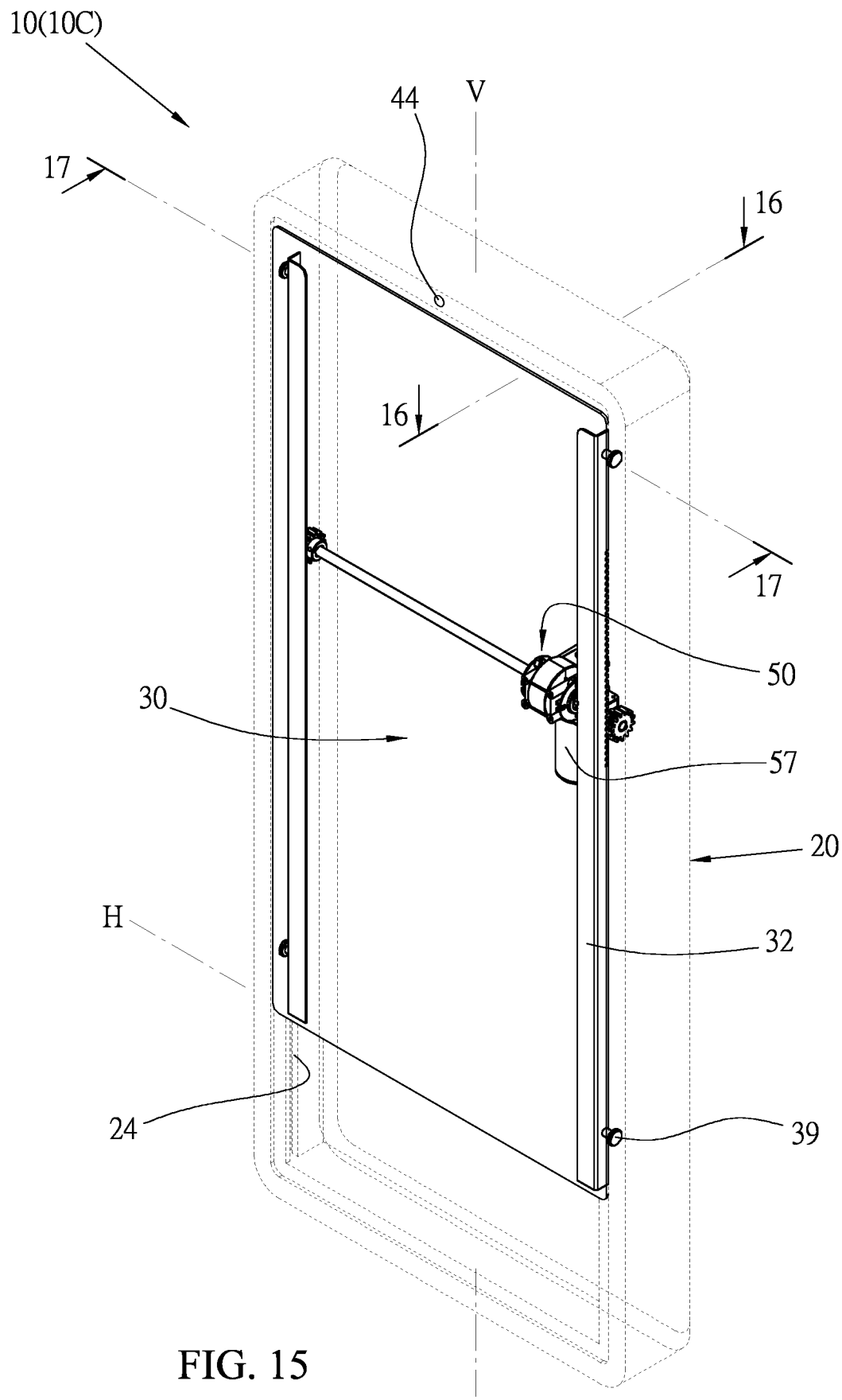
FIG. 15 is a perspective view of the smart mirror in accordance with a third embodiment of the present invention.
Figure 16:
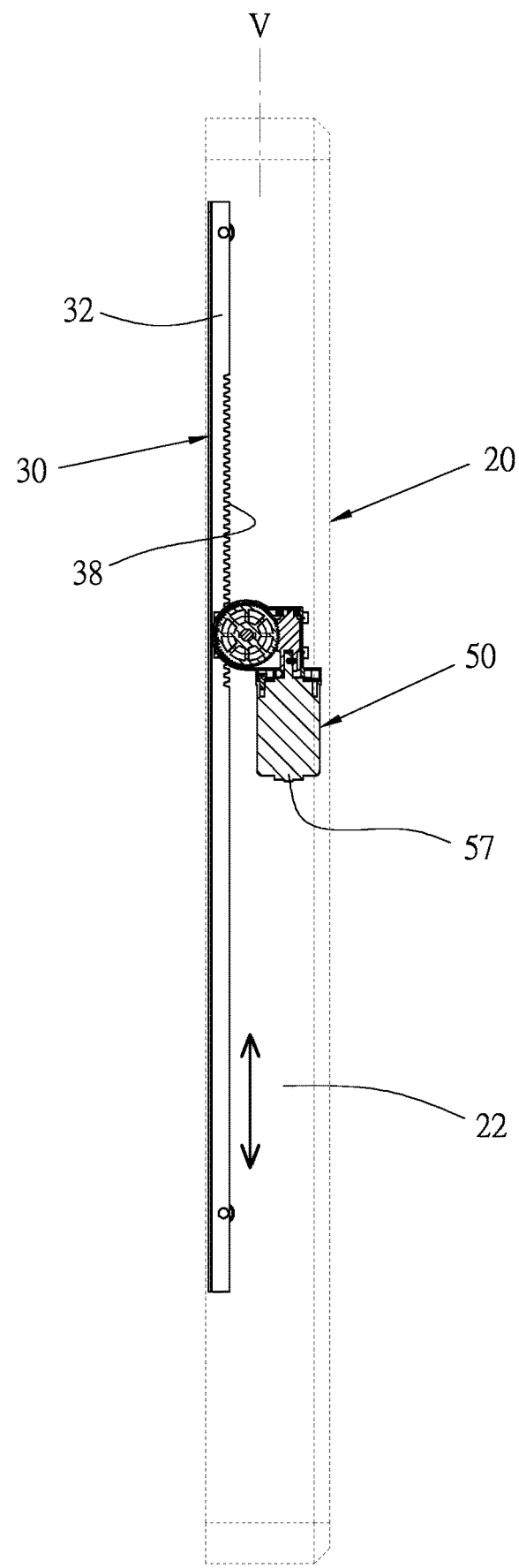
FIG. 16 is a cross-section view along line 16-16 of FIG. 15.
Figure 17:
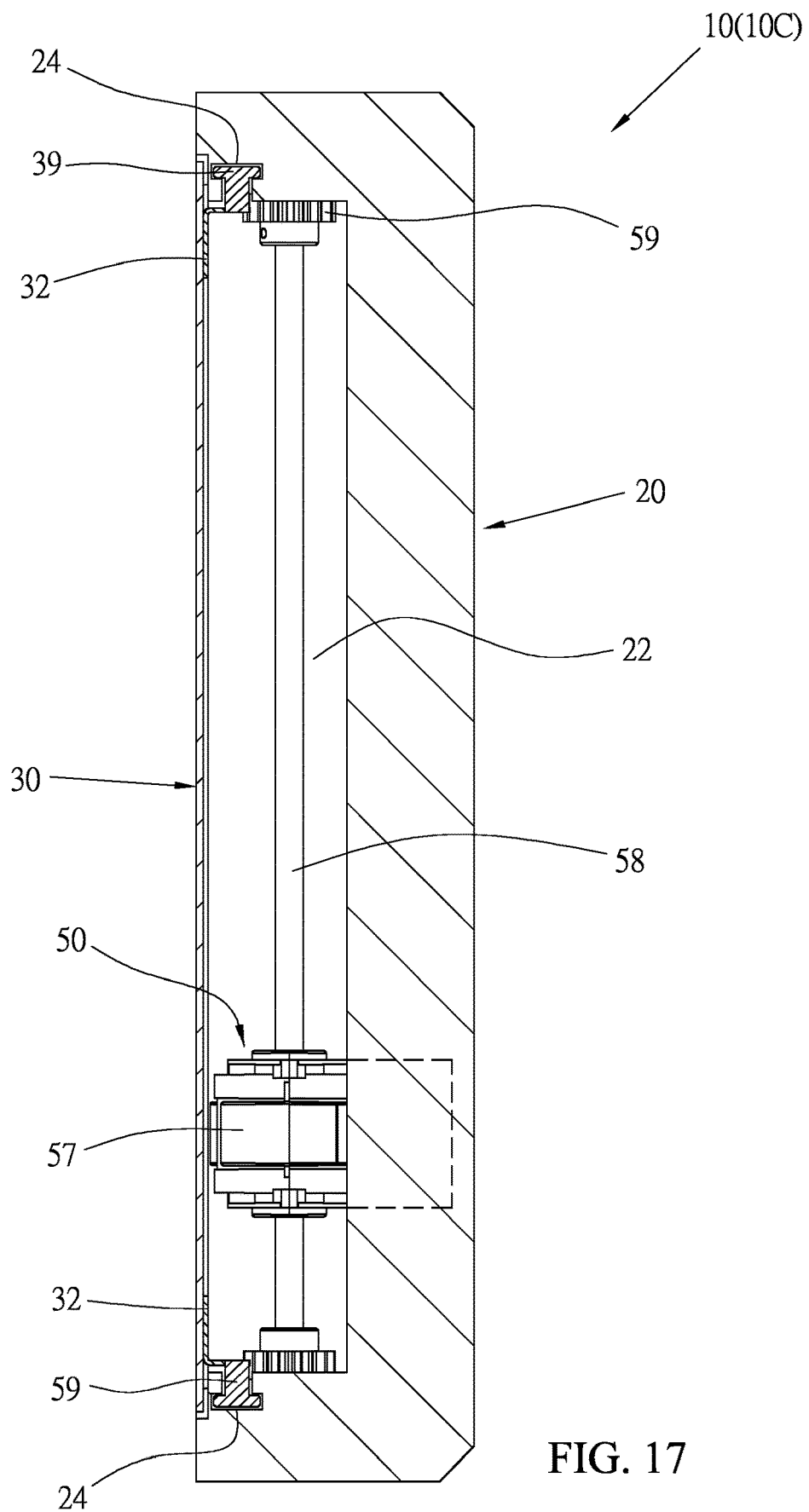
FIG. 17 is a cross-section view along line 17-17 of FIG. 15.
Figure 18:
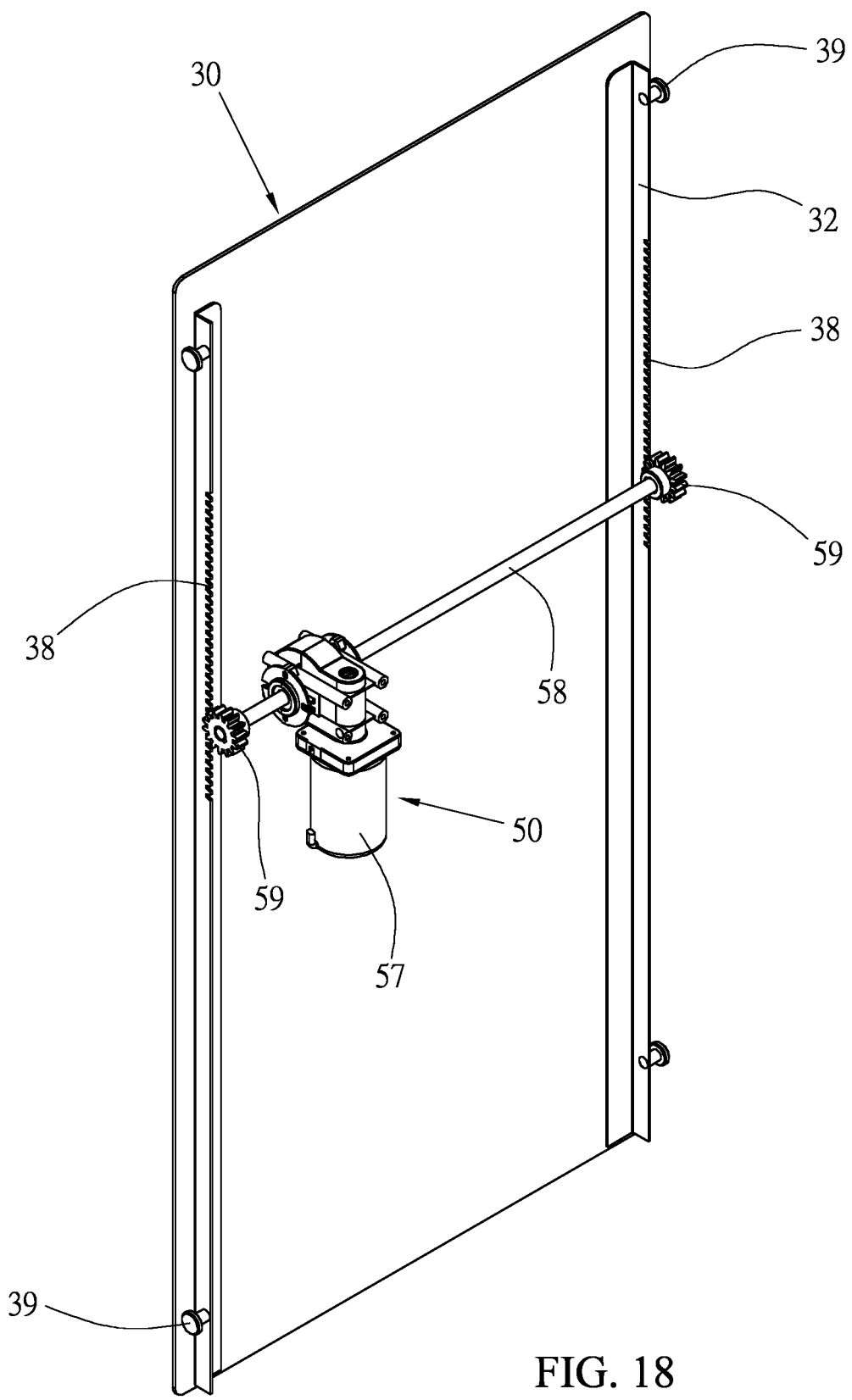
FIG. 18 is a perspective view showing the mirror and the driving mechanism of the smart mirror shown in FIG. 15.

Referring to FIG. 15 to FIG. 17, a smart mirror 10C is illustrated in accordance with a third preferred embodiment of the present invention. The third embodiment is similar to the aforementioned embodiments, except that the driving mechanism 50 is operable to drive the mirror 30 to move vertically along with the vertical axis V of the frame 20. As shown in FIG. 18, the driving mechanism 50 has an electric motor 57 (e.g. a stepper motor) mounted on the frame 20. When the electric motor 57 is operable to rotate a rotating shaft 58, the mirror 30 can be driven to move vertically along with the vertical axis V of the frame 20 by meshing relationship of several gears 59 on the rotating shaft 58 and several vertical gear racks 38 disposed on the bracket 32. As shown in FIG. 18 and referring to FIG. 15, the bracket 32 has two retaining members 39 disposed on two lateral sides of the bracket 32, and the frame 20 has two longitudinal grooves 24 defined in the inner walls at two sides of the frame 20. The two retaining members 39 of the bracket 32 are able to be inserted in the respective longitudinal grooves 24 of the frame 20, so that the mirror 30 can move along the vertical axis V. Note that the method of vertically moving the mirror 30 described in this example are illustrative only. There are many other ways of translating the position of the mirror 30 to reposition the mirror 30, in the vertical direction, or the horizontal direction, or any other direction, and it will be apparent to those skilled in the art that various modifications and variations can be made to the structure of the present invention without departing from the scope or spirit of the invention.

Figure 19:
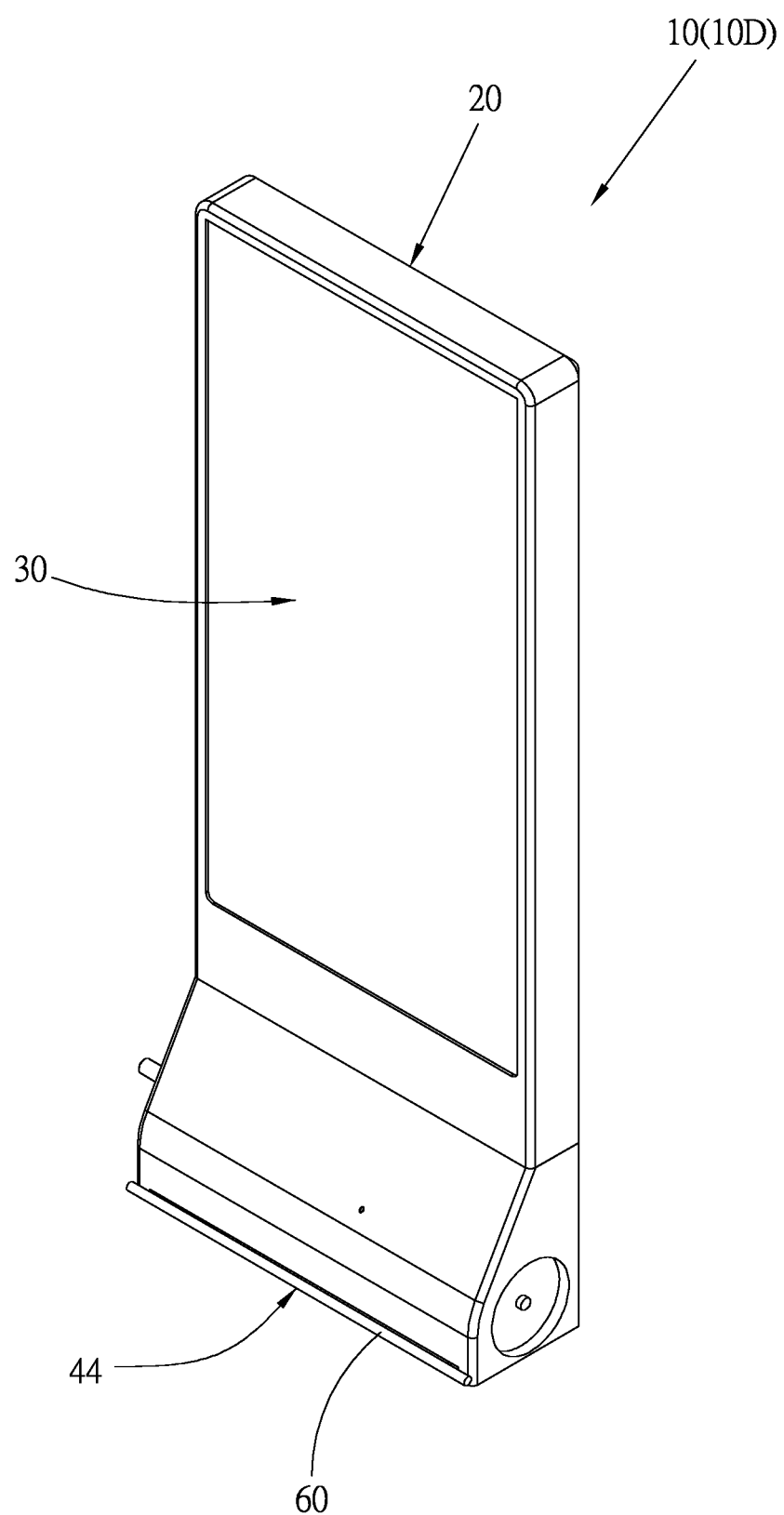
FIG. 19 is a perspective view of the smart mirror in accordance with a fourth embodiment of the present invention.
Figure 20:
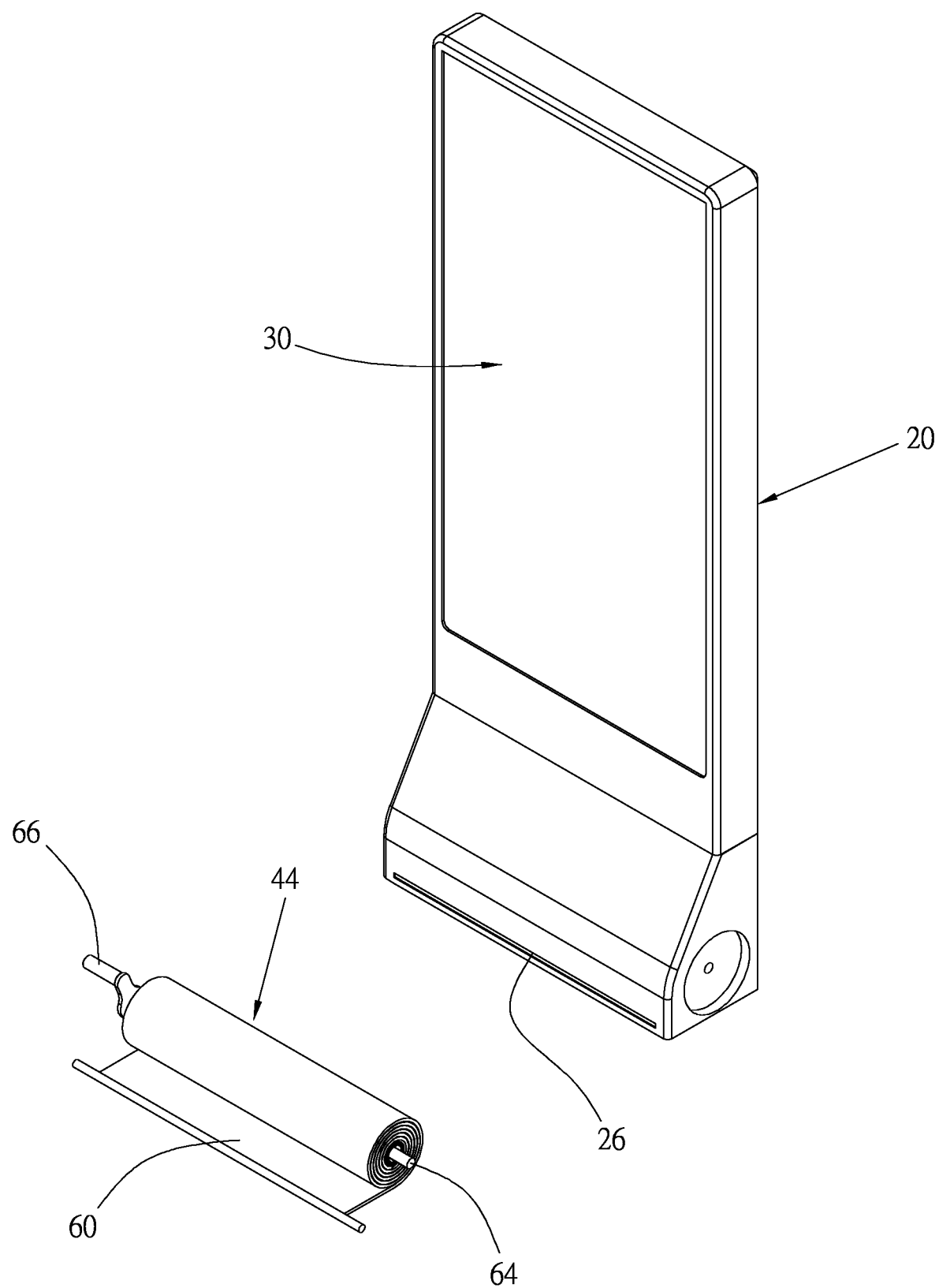
FIG. 20 is a partial exploded view of FIG. 19.
Figure 21:
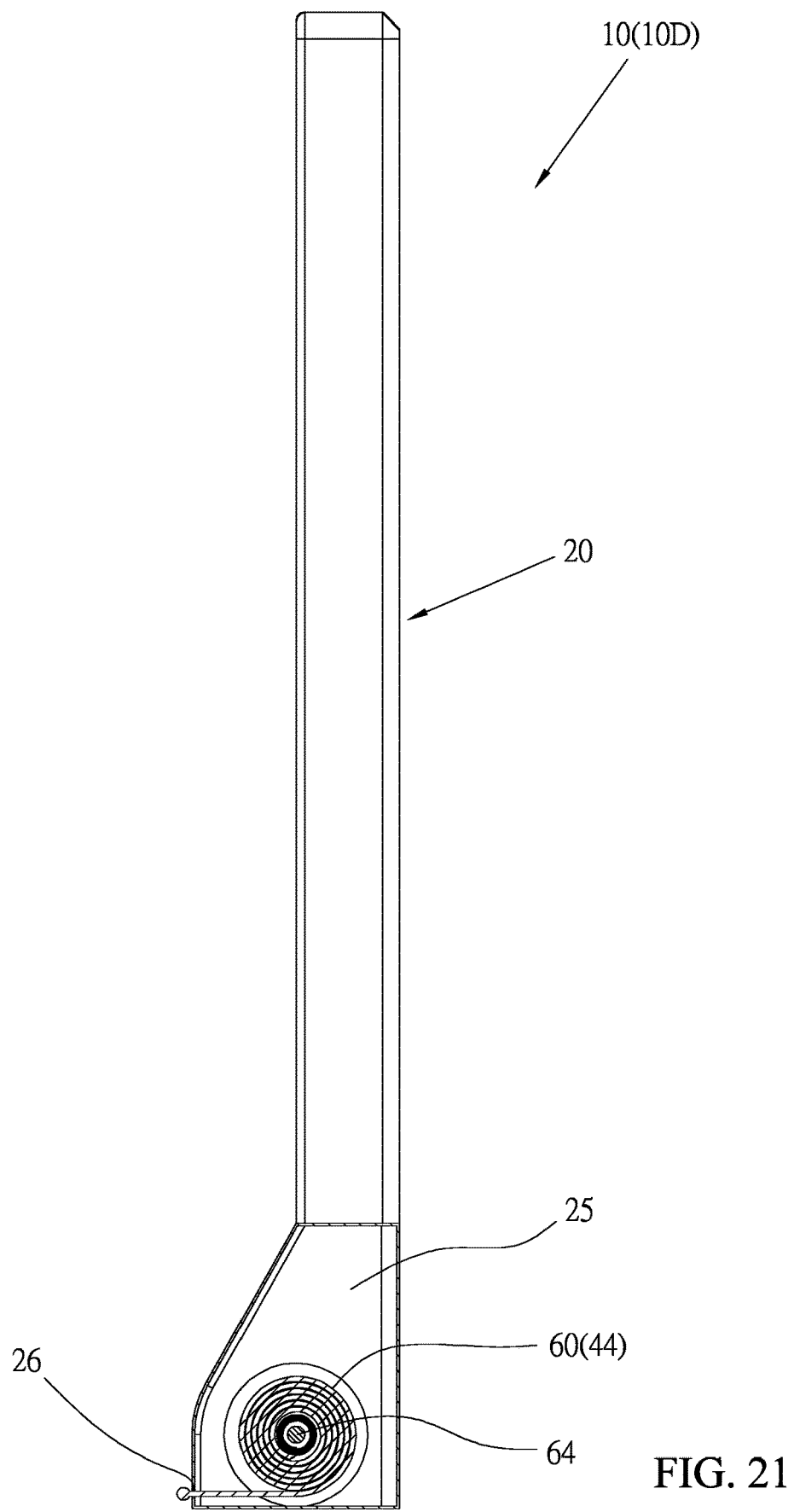
FIG. 21 is a side view of FIG. 19.
Figure 22:
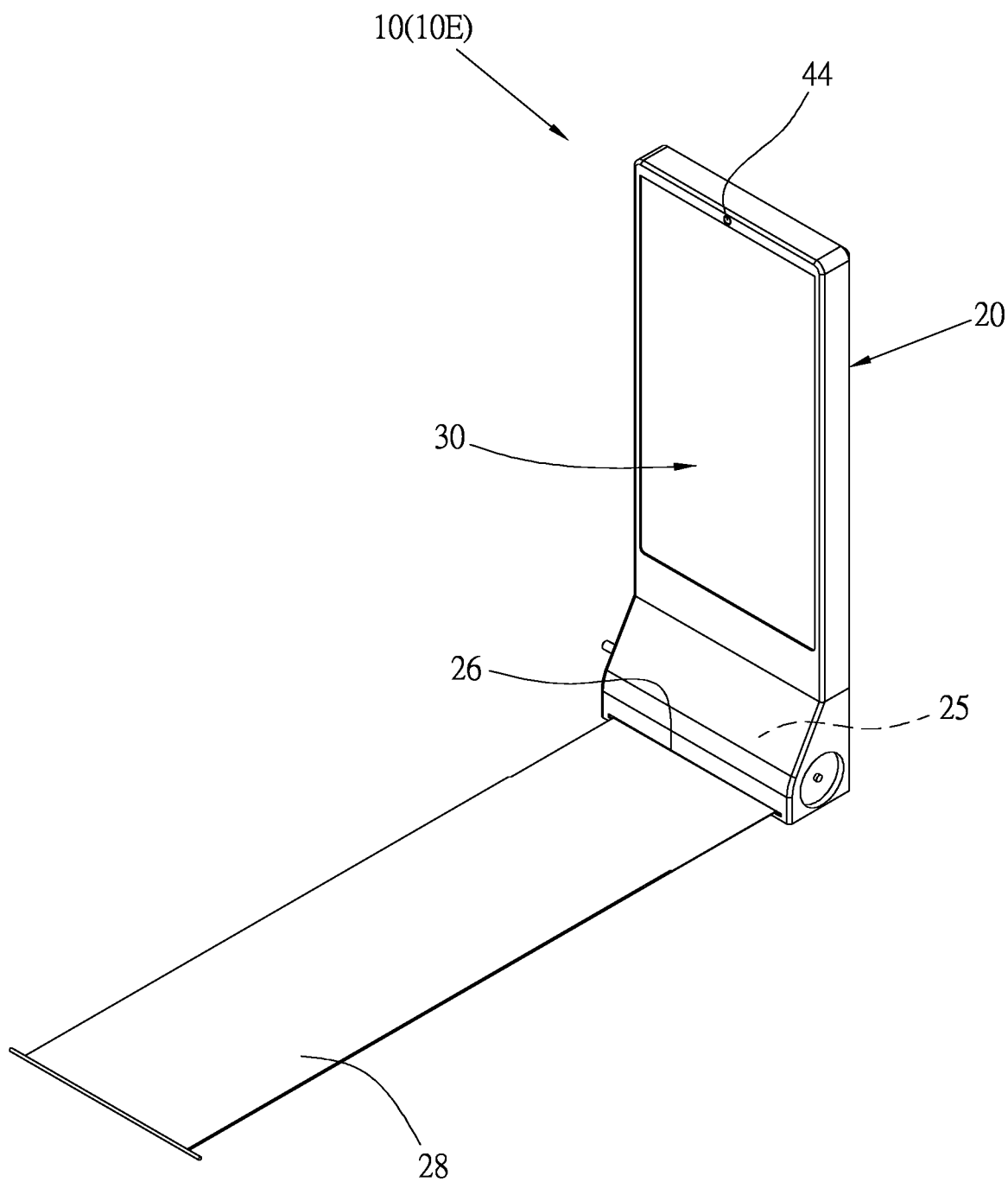
FIG. 22 is a perspective view of the smart mirror in accordance with a fifth embodiment of the present invention, showing that the smart mirror is provided with an exercise pad.

Referring to FIG. 19 to FIG. 21, a smart mirror 10D is illustrated in accordance with a fourth preferred embodiment of the present invention. The fourth embodiment is similar to the aforementioned embodiments, except that the smart mirror 10D has a pad body 60 which can be rolled into a receiving chamber 25 at the bottom of the frame 20 by a reel 64 to save space. In the preferred embodiment, the pad body 60 may be regarded as the determination unit 44 with a plurality of sensors 62 disposed regularly on the pad body 60 to function as a pressure-sensing pad, as shown in FIG. 8. The pad body 60 can be rolled up manually by a handle 66, automatically rolled up with elastic members (e.g. spiral spring), or rolled up by a motorized system. When in use, the user can pull out the pad body 60 from the opening 26 at the bottom of the frame 20 so that the pad body 60 is located on the ground in front of the frame 20.

Figure 23:
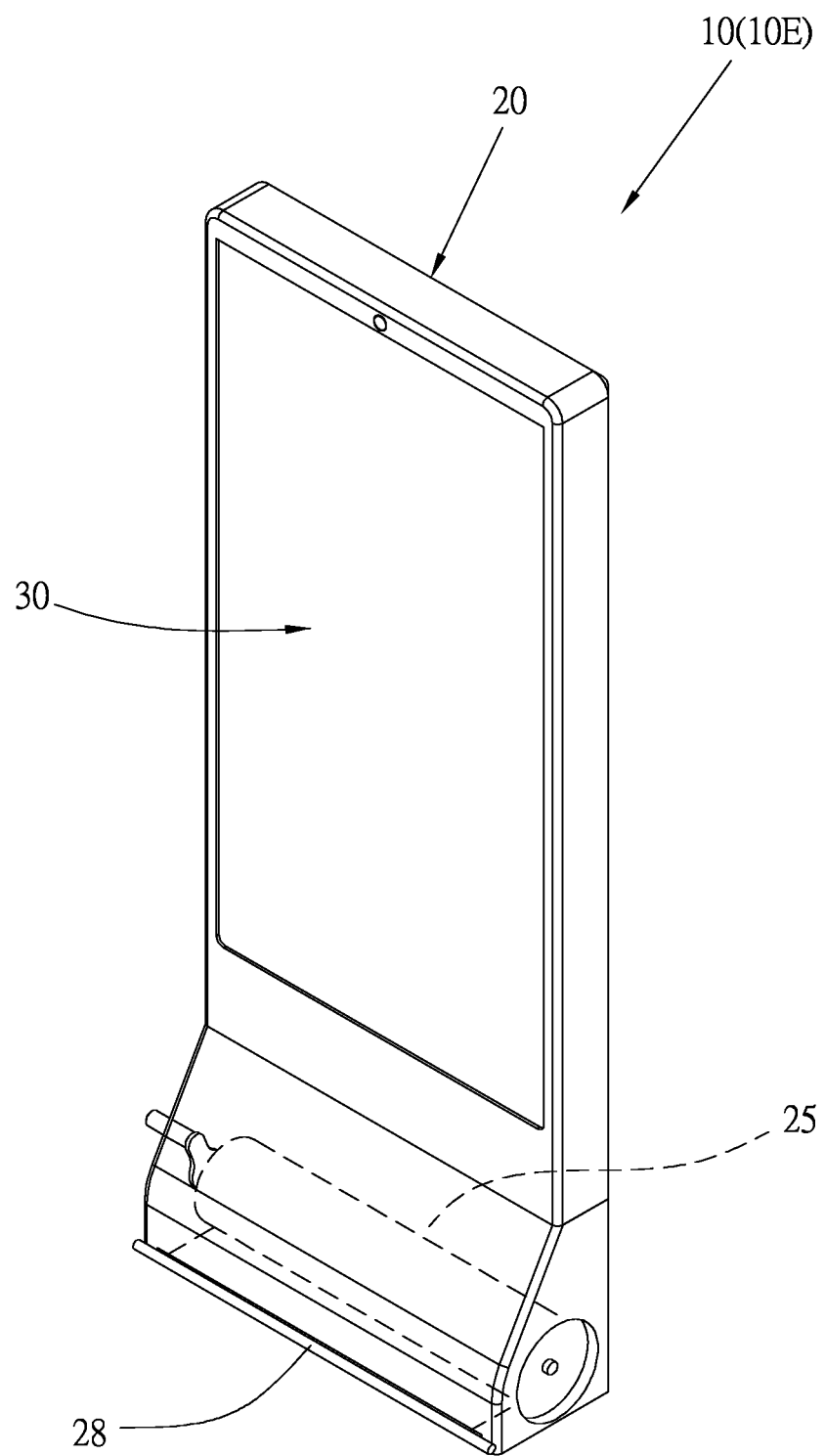
FIG. 23 is a perspective view of the smart mirror shown in FIG. 22, wherein the exercise pad is stored within the smart mirror.

FIG. 23 illustrate a smart mirror 10E in accordance with a fifth preferred embodiment of the present invention. The fifth embodiment is similar to the fourth preferred embodiment, except that the pad body is an exercise pad 28 without any sensor thereon and the determination unit 44 is a camera device disposed on the frame 20 for identifying the location of the user.

Accordingly, when the user uses the smart mirror 10 for fitness exercises, the smart mirror 10 can automatically adjust the angle and/or height of the mirror 30, so that the mirror 30 can face toward the user at any time for allowing the user to see their reflected image in the mirror 30 during exercise. The smart mirror 10 can be controlled by the control unit 40 to control two-dimensional or three-dimensional displacement of the mirror 30 along the vertical axis V and/or the horizontal axis H according to the judgement of the determination unit 44. The determination unit 44 can predict, sense or detect the motion of the user, and determine the posture or location of the user. The control unit 40 is operable to rotate and/or move the mirror 30 through the driving mechanism 50 according to the prediction or detection result, so that the mirror 30 can be kept facing the user to allow the user to see the guiding images and the reflected image during exercise. Furthermore, the determination unit 44 may be operated to record the user's movement and to simultaneously display the guiding image and the user's movement on the mirror so as to enhance the interaction between the user and the smart mirror and the training effect.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An interactive exercise apparatus for guiding a user to perform an exercise, comprising:
   a frame;
   a mirror movably mounted on the frame, the mirror configured to reflect an image of the user in front of the mirror;
   a display device disposed on a backside of the mirror and being visible through the mirror, the display device provided to show workout information and video content for the user, the video content including a guiding image configured to guide the user to perform the exercise;
   a driving mechanism configured to drive the mirror to move with respect to the frame; and
   a control unit electrically connected to the driving mechanism, the control unit being operable to control the driving mechanism according to a location of the user so as to control the mirror to move to a suitable position where the user can see their reflected image.

2. The interactive exercise apparatus as claimed in claim 1, further comprising a determination unit configured to determine the location or posture of the user, wherein the control unit is operable to control the driving mechanism to drive the mirror according to the location or posture of the user identified by the determination unit.

3. The interactive exercise apparatus as claimed in claim 1, wherein the frame defines a vertical direction and a horizontal direction perpendicular to the vertical direction, the driving mechanism being operable to drive the mirror to move in the vertical direction and/or the horizontal direction with respect to the frame.

4. The interactive exercise apparatus as claimed in claim 2, wherein the determination unit is operable to predict the location or posture of the user according to movement of the guiding image which guiding the user to perform the exercise.

5. The interactive exercise apparatus as claimed in claim 2, wherein the determination unit has an image recognition device configured to detect the location or posture of the user by means of image recognition.

6. The interactive exercise apparatus as claimed in claim 5, wherein the image recognition device of the determination unit comprises an optical sensing device, an infrared sensing device, a camera device or a thermal sensing device.

7. The interactive exercise apparatus as claimed in claim 2, wherein the determination unit is capable of predicting a location of a head or eyes of the user who follows the guiding image for the exercise; and the control unit is operable to control the driving mechanism according to the location of the head or eyes of the user predicted by the determination unit to control movement of the mirror to a position where the user is able to see their reflected image in the mirror easily.

8. The interactive exercise apparatus as claimed in claim 1, wherein the mirror is pivotable with respect to the frame about a lateral pivot, so that the mirror can be tilted up within a predetermined inclination angle.

9. The interactive exercise apparatus as claimed in claim 1, wherein the mirror is pivotable with respect to the frame about a lateral pivot, so that the mirror can be tilted down within a predetermined declination angle.

10. The interactive exercise apparatus as claimed in claim 1, wherein the mirror has at least one gear rack mounted on a backside of the mirror, the driving mechanism comprising a motor mounted on the frame, the motor coupled to the at least one gear rack of the mirror by at least one gear, so that the driving mechanism is operable to drive the mirror to move with respective to the frame.

11. The interactive exercise apparatus as claimed in claim 1, wherein the mirror is pivotable with respect to the frame about a pivot portion, the driving mechanism comprising an electric telescopic member having one end pivotally connected to the frame and the other end pivotally connected to the mirror; wherein when the electric telescopic member is stretched or shortened, the mirror is able to rotate about the pivot portion.

12. An interactive exercise apparatus for guiding a user to perform an exercise, comprising:
   a frame;
   a mirror movably mounted on the frame, the mirror configured to reflect an image of the user in front of the mirror;
   a display device disposed on a backside of the mirror and being visible through the mirror, the display device provided to show workout information and video content for the user to view, the video content including a guiding image configured to guide the user to perform an exercise;
   a driving mechanism mounted between the frame and the mirror, and electrically driving the mirror to move with respect to the frame;
   a determination unit configured to analyze a posture of the guiding image; and
   a control unit electrically connected to the driving mechanism and the determination unit, the control unit being operable to control the driving mechanism according to the posture of the guiding image so as to adjust a position of the mirror.

13. The interactive exercise apparatus as claimed in claim 12, wherein the frame defines a vertical direction and a horizontal direction perpendicular to the vertical direction, the driving mechanism being operable to drive the mirror to move in the vertical direction and/or the horizontal direction with respect to the frame.

14. The interactive exercise apparatus as claimed in claim 12, wherein the determination unit is operable to predict a location or posture of the user according to movement or instruction of the guiding image which guiding the user to perform the exercise.

15. The interactive exercise apparatus as claimed in claim 12, wherein the determination unit is configured to determine a location or posture of the user, and the control unit is operable to control the driving mechanism according to the location or posture of the user to adjust the position of the mirror.

16. The interactive exercise apparatus as claimed in claim 12, wherein the determination unit has an image recognition device configured to detect a location or posture of the user by means of image recognition.

17. The interactive exercise apparatus as claimed in claim 12, wherein the determination unit is capable of predicting a location of a head or eyes of the user who follows the guiding image for the exercise; and the control unit is operable to control the driving mechanism according to the location of the head or eyes of the user predicted by the determination unit to control movement of the mirror to a position where the user is able to see their reflected image in the mirror easily.

18. The interactive exercise apparatus as claimed in claim 12, wherein the mirror is pivotable with respect to the frame about a lateral pivot, so that the mirror can be tilted up or tilted down within a predetermined range.

19. The interactive exercise apparatus as claimed in claim 12, wherein the mirror has at least one gear rack mounted on a backside of the mirror, the driving mechanism comprising a motor mounted on the frame, the motor coupled to the at least one gear rack of the mirror by at least one gear, so that the driving mechanism is operable to drive the mirror to move with respective to the frame.

20. The interactive exercise apparatus as claimed in claim 12, wherein the mirror is pivotable with respect to the frame about a pivot portion, the driving mechanism comprising an electric telescopic member having one end pivotally connected to the frame and the other end pivotally connected to the mirror; wherein when the electric telescopic member is stretched or shortened, the mirror is able to rotate about the pivot portion.

* * * * *